US008439256B2

(12) United States Patent
Hodnett et al.

(10) Patent No.: US 8,439,256 B2
(45) Date of Patent: May 14, 2013

(54) BALLISTIC NOMOGRAPH FOR SMALL ARMS FIRE

(76) Inventors: Stephen Todd Hodnett, Arthur City, TX (US); Robert Wayne Brewington, Mooresville, IN (US); Bryan Scott Litz, Cedar Springs, MI (US)

( * ) Notice: Subject to any disclaimer, the term of this patent is extended or adjusted under 35 U.S.C. 154(b) by 170 days.

(21) Appl. No.: 12/852,174

(22) Filed: Aug. 6, 2010

(65) Prior Publication Data

US 2012/0031972 A1 Feb. 9, 2012

(51) Int. Cl.
*G06F 19/00* (2006.01)

(52) U.S. Cl.
USPC .......................................... 235/406; 235/78 R

(58) Field of Classification Search ................ 235/78 R, 235/405, 406, 407
See application file for complete search history.

(56) References Cited

U.S. PATENT DOCUMENTS 4,311,902 A * 1/1982 Koll ............................ 235/78 R
2012/0132708 A1* 5/2012 White et al. .................. 235/406

OTHER PUBLICATIONS

U.S. Appl. No. 61/296,328 to White, 18 pages, Feb. 1, 2010.

* cited by examiner

*Primary Examiner* — Karl D Frech
(74) *Attorney, Agent, or Firm* — Barnes & Thornburg LLP

(57) ABSTRACT

A ballistic nomograph for determining a firing solution for small arms fire includes a first member and a second member. Alignment of first indicia on the first member with the first indicia on the second member aligns the value of a range to a target with a first environmental condition to align a first adjustment value with an indicator positioned on the first member to provide a firing solution adjustment to a user. A method of determining a firing solution for a small arm by manually manipulating a ballistic nomograph includes determining environmental conditions and aligning the value of a range to a target with a value of environmental condition. The method also includes visually identifying a firing solution adjustment value that corresponds to the particular combination of the range to the target and environmental condition, and making a firing solution adjustment based on the firing solution adjustment value.

23 Claims, 8 Drawing Sheets

| | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| 1 | 0.9 | 1.9 | 2.9 | 3.9 | 4.9 | 5.9 | 6.9 | 7.9 | 8.9 | 9.9 | 10.9 | 11.9 | 12.9 | 13.9 | 14.9 | 15.9 | 16.9 | 17.9 | 18.9 | 19.9 |
| 10 | 0.9 | 1.8 | 2.8 | 3.8 | 4.8 | 5.8 | 6.8 | 7.8 | 8.8 | 9.8 | 10.8 | 11.8 | 12.8 | 13.8 | 14.7 | 15.7 | 16.7 | 17.7 | 18.7 | 19.7 |
| 15 | 0.8 | 1.8 | 2.7 | 3.7 | 4.7 | 5.7 | 6.6 | 7.6 | 8.6 | 9.6 | 10.5 | 11.5 | 12.5 | 13.5 | 14.4 | 15.4 | 16.4 | 17.4 | 18.3 | 19.3 |
| 20 | 0.7 | 1.7 | 2.8 | 3.6 | 4.5 | 5.5 | 6.4 | 7.4 | 8.3 | 9.6 | 10.2 | 11.2 | 12.1 | 13.1 | 14.0 | 15.6 | 16.6 | 16.8 | 17.6 | 18.6 |
| 25 | 0.6 | 1.6 | 2.5 | 3.4 | 4.3 | 5.2 | 6.1 | 7.0 | 8.0 | 8.9 | 9.8 | 10.7 | 11.8 | 12.5 | 12.8 | 14.4 | 15.4 | 16.2 | 17.1 | 18.0 |
| 30 | 0.5 | 1.4 | 2.3 | 3.1 | 4.0 | 4.8 | 5.8 | 6.6 | 7.6 | 8.4 | 9.3 | 10.1 | 11.0 | 11.9 | 12.6 | 13.9 | 14.5 | 15.4 | 16.3 | 17.1 |
| 35 | 0.4 | 1.2 | 2.1 | 2.8 | 3.7 | 4.5 | 5.4 | 6.2 | 7.0 | 7.8 | 8.7 | 9.5 | 10.3 | 11.2 | 12.0 | 12.9 | 13.7 | 14.5 | 15.3 | 16.4 |
| 40 | 0.3 | 1.1 | 1.9 | 2.6 | 3.4 | 4.2 | 4.8 | 5.7 | 6.5 | 7.6 | 8.0 | 8.8 | 9.6 | 10.4 | 11.1 | 11.9 | 12.7 | 13.5 | 14.2 | 15.0 |
| 45 | 0.2 | 0.8 | 1.8 | 2.3 | 3.0 | 3.7 | 4.5 | 5.2 | 5.8 | 6.6 | 7.3 | 8.0 | 8.7 | 9.4 | 10.2 | 10.9 | 11.6 | 12.3 | 13.0 | 13.7 |
| 50 | 0.0 | 0.7 | 1.6 | 2.0 | 2.8 | 3.3 | 3.8 | 4.6 | 5.2 | 5.0 | 6.5 | 7.2 | 7.8 | 8.5 | 9.1 | 9.8 | 10.4 | 11.0 | 11.7 | 12.3 |
| 55 | -0.1 | 0.5 | 1.1 | 1.6 | 2.2 | 2.8 | 3.3 | 3.9 | 4.5 | 5.1 | 5.6 | 6.2 | 6.8 | 7.4 | 7.9 | 8.5 | 9.1 | 9.8 | 10.2 | 10.3 |
| 60 | -0.2 | 0.3 | 0.6 | 1.3 | 1.8 | 2.6 | 2.8 | 3.2 | 2.7 | 4.2 | 4.7 | 6.2 | 5.7 | 6.2 | 6.7 | 7.2 | 7.7 | 8.2 | 8.7 | 9.2 |

BALLISTIC NOMOGRAPH FOR SMALL ARMS FIRE

BACKGROUND

The present disclosure is related to an apparatus and method for determining aiming corrections for improving the accuracy of small arms. More specifically, the present disclosure is related to a manual calculator used to adjust the aiming point of a small arms weapon.

Several factors are known to affect the accuracy of small arms weapons including rifles used to fire at targets at ranges of greater than 1000 meters. For example, weapons up to and including 50 caliber rifles are used by the United States military to strike strategic targets at ranges reaching and exceeding 1500 meters. Proper aiming of a small arms weapon requires a user to adjust for the particular weapon and ammunition combination. The particular weapon and ammunition combination will result in a particular muzzle velocity, twist rate, ballistic coefficient for the bullet and spin drift which will result in a specific trajectory for the bullet under ideal conditions.

Other factors also influence the proper choice of aim point when a small arms weapon is being fired in the field. Atmospheric conditions including temperature, barometric pressure, and relative humidity affect the flight characteristics of a bullet. Ballisticians and weapons users often apply a factor known as the density altitude to adjust for the atmospheric conditions over a particular firing range. The density altitude is normally expressed in feet or thousands of feet and can be determined by adjusting the actual altitude above sea level based on the temperature at the actual altitude as defined by International Civil Aviation Organization (ICAO) Standard or by the Standard Metro developed by the US Army in 1905.

Another factor which affects the choice of the aim point is the target distance. At extreme distances, such as greater than 1500 meters, a Coriolis effect may impact the selection of the proper aim point. In most instances, the Coriolis effect is of such insignificance that it can be ignored in most instances, but it must be noted dependant on where you are on the earth and at what vector you will be firing. Coriolus functions much like spin drift but is tied to the relationship of the Earth's rotation and the amount of the Earth has moved during the time of fight of the bullet. This calculation is highly dependent on which hemisphere of the earth you are in as well as your longitude and latitude on the earth and the vector the bullet will be traveling. The above results in a correction to your aiming point based on these conditions. However, the target distance does relate to the effect of gravity on the bullet as it travels to the target. Compounding the effect of gravity in adjusting the aim point is the inclination or look angle between the firing point and the target. If the target is lower than the firing point, the ballistic trajectory of the bullet will have a shape that is significantly different from the shape of the trajectory for a bullet fired at a target having an elevation higher than the firing point. Thus, users adjust the aim point depending on the inclination angle as well as the average air density variation from the muzzle to the inclined or declined target. A cosine correction is used to compensate for the difference in the position of the firing point as well as adjustments for gravitational force variations and air density variations to the target and is dependent on both the target distance and the inclination angle as well as any additional modifications due to gravity from shooting up hill or downhill and from the bullet traveling thru high and lower air density resulting from shooting up or down.

In addition to the vertical adjustments described above, a user must adjust the point to correct for any wind that may be present over the firing range. It is known in the art to adjust an aim point based on a resultant wind vector that they weapon user calculates based on external factors observed over the firing range. The wind vector combined with the density altitude determines the horizontal deviation that will be experienced by a bullet in-flight over the range. Variations in ammunition result in variations in a ballistic coefficient of the bullet. The ballistic coefficient, expressed as a pressure, is a measure of the resistance applied to the bullet during flight. A higher ballistic coefficient, the lower the drag experienced by the bullet and subsequently reducing the effects of wind as well.

Finally, a user must consider the inherent variations of a particular weapon or around in making aim point adjustments. For example, a particular lot of ammunition may vary slightly in their performance, thereby affecting the accuracy at which the bullet can be aimed. The weapon user may also find that a particular weapon various slightly from the performance of a standardized weapon such that the user may need to adjust the either the ballistic coefficient or the muzzle velocity based on the particular weapon. The process of adjusting for the inherent variation in weapons and munitions used in the field is referred to as truing. Truing is the final consideration a weapon user must implement to maximize the accuracy at which the weapon may be fired.

Over time, ballisticians and weapons users have developed tools and calculators to be used by a weapon user to modify the aim point of a weapon to compensate for the various factors discussed above.

SUMMARY

According to one aspect of the current disclosure, a ballistic nomograph for determining a firing solution for small arms fire comprises a first member and a second member. The first member may include first indicia corresponding to a plurality first environmental conditions and a first indicator. The second member is movable relative to the first member. The second member may include first indicia corresponding to a plurality of ranges to a target and second indicia corresponding to a plurality of first adjustment values corresponding to corrections to a nominal firing solution. Alignment of the first indicia of the first member with the first indicia of the second member such that alignment of the range to a target with a first environmental condition causes an first adjustment value to be aligned with the first indicator positioned on the first member so as to provide a firing solution adjustment to a user.

The first indicia on the first member may include a plurality of density altitude values. The first adjustment value corresponds to an adjustment to the vertical setting of a rifle scope. The second member may be rotatably coupled to the first member such that the second member rotates about an axis.

The first member may include a plurality of windows and the first and second indicia of the second member may be visible through the windows. The second indicia on the second member may include a plurality of different adjustment values for each combination of range and environmental condition. The plurality of different first adjustment values may correspond to variations in muzzle velocity.

The second member may be marked with indicia that are unique to a particular combination of weapon and ammunition. The nomograph may be a kit having a plurality of second members. The second member may be removable from the nomograph such that different second members may be used, with each second member marked with indicia that is unique to a particular weapon and ammunition and different from other second members.

The nomograph may further include a third member movable relative to the first member. The third member may be marked with first indicia corresponding to a plurality of second environmental conditions. The first member may include a second indicator and second indicia corresponding to a plurality of third environmental conditions. Alignment of the first indicia of the third member with second indicia of the first member may cause a value of a first environmental condition to be positioned adjacent the second indicator of the first member.

The first environmental condition may be density altitude. The second environmental condition may be an altitude above sea level. The third environmental condition an air temperature.

The first member may include a plurality of windows with each window corresponding to different ranges of first environmental conditions. The first member may include indicia corresponding to a plurality of fourth environmental conditions and a third indicator. The fourth environmental conditions may include wind vector values.

The second member may include indicia corresponding to a plurality of second adjustment values. Alignment of the first indicia of the first member with the first indicia of the second member such that alignment of the range to a target with a first environmental condition may cause a second adjustment value to be aligned with the third indicator positioned on the first member and a fourth environmental condition on the second member so as to provide a firing solution adjustment to a user.

According to another aspect of the present disclosure, a method of determining a firing solution for small arms by manually manipulating a nomograph includes determining environmental conditions and aligning the value of a range to a target with a value of environmental condition. The method also includes visually identifying a firing solution adjustment value that corresponds to the particular combination of the range to the target and environmental condition, and making a firing solution adjustment based on the firing solution adjustment value.

Determining environmental conditions may include determining a density altitude correction value. Determining the density altitude may include aligning the value of the altitude of the firing range with the temperature of the firing range.

Visually identifying a firing solution may include visually identifying a nominal drop adjustment value. Visually identifying a firing solution further may include determining a corrected drop adjustment value based on the look angle or inclination angle between the firing point and the target.

Visually identifying a firing solution may include visually identifying a drop adjustment value adjusted for a deviation in the muzzle velocity of the weapon being fired from a theoretical muzzle velocity.

The method may further comprise determining a corrected environmental condition based on performance of the weapon. The corrected environmental condition may comprise a density altitude correction. Visually identifying a firing solution may include visually identifying a drop adjustment value adjusted by the density altitude correction.

Additional features and advantages of the invention will become apparent to those skilled in the art upon consideration of the following detailed description of illustrated embodiments exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

Figure 1:
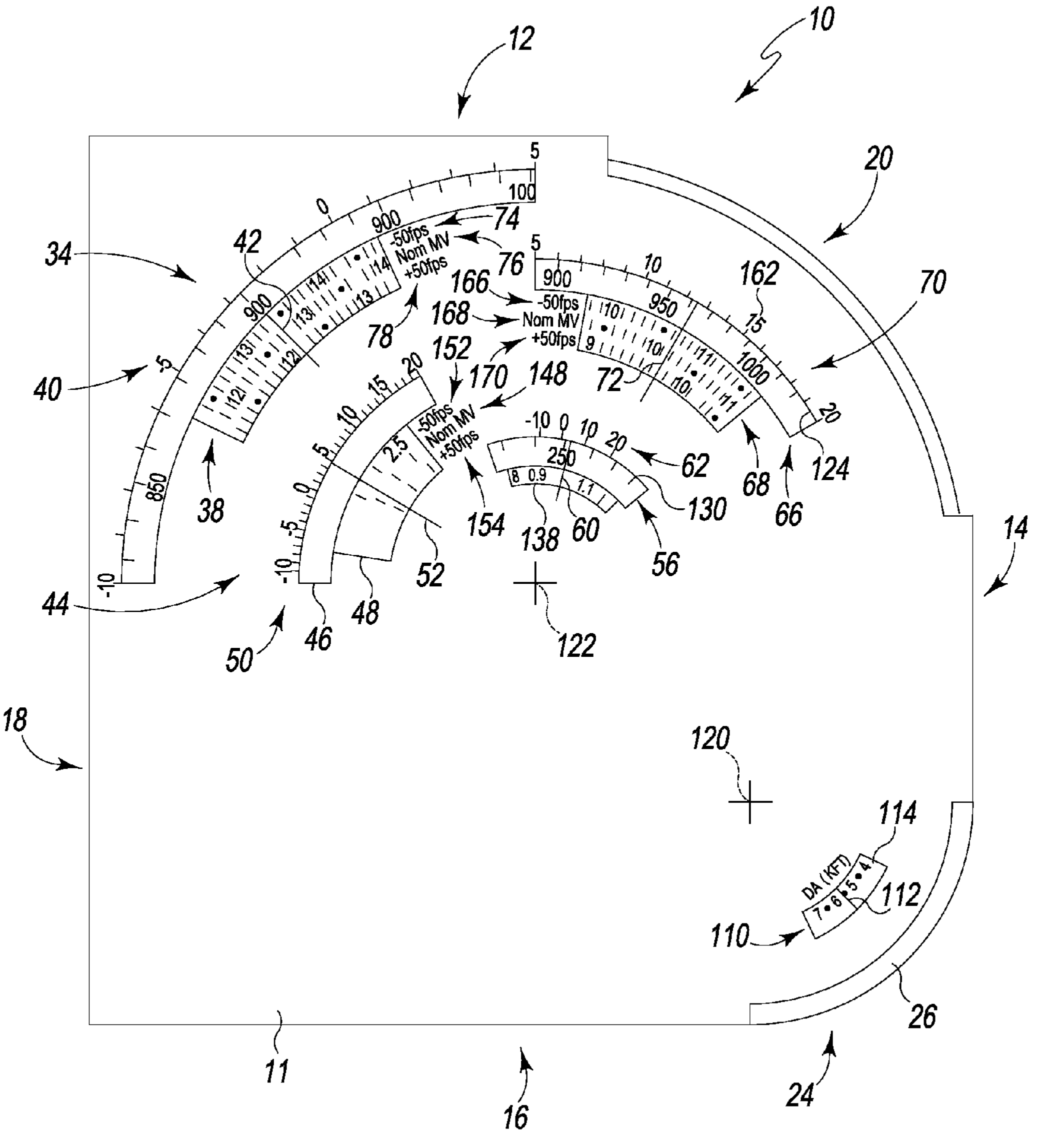
FIG. 1 is a front view of a ballistic nomograph.

A ballistic nomograph 10 shown in FIG. 1 is manually actuable to allow a user to calculate adjustments to the aim point of a small arms weapon, such as a high-powered rifle, for example. The adjustments calculated are based on characteristics of the range over which the weapon is to be fired. For example the distance from the firing point to the target, changes in elevation from the firing point to the target, atmospheric conditions, and weapon and ammunition variations are considered by the user. The ballistic nomograph 10 is manipulated by the user to input factors that relate to the characteristics of the range the user with the ballistic nomograph 10 providing output to the user indicative of the adjustments to be made to target the weapon accurately.

Figure 2:
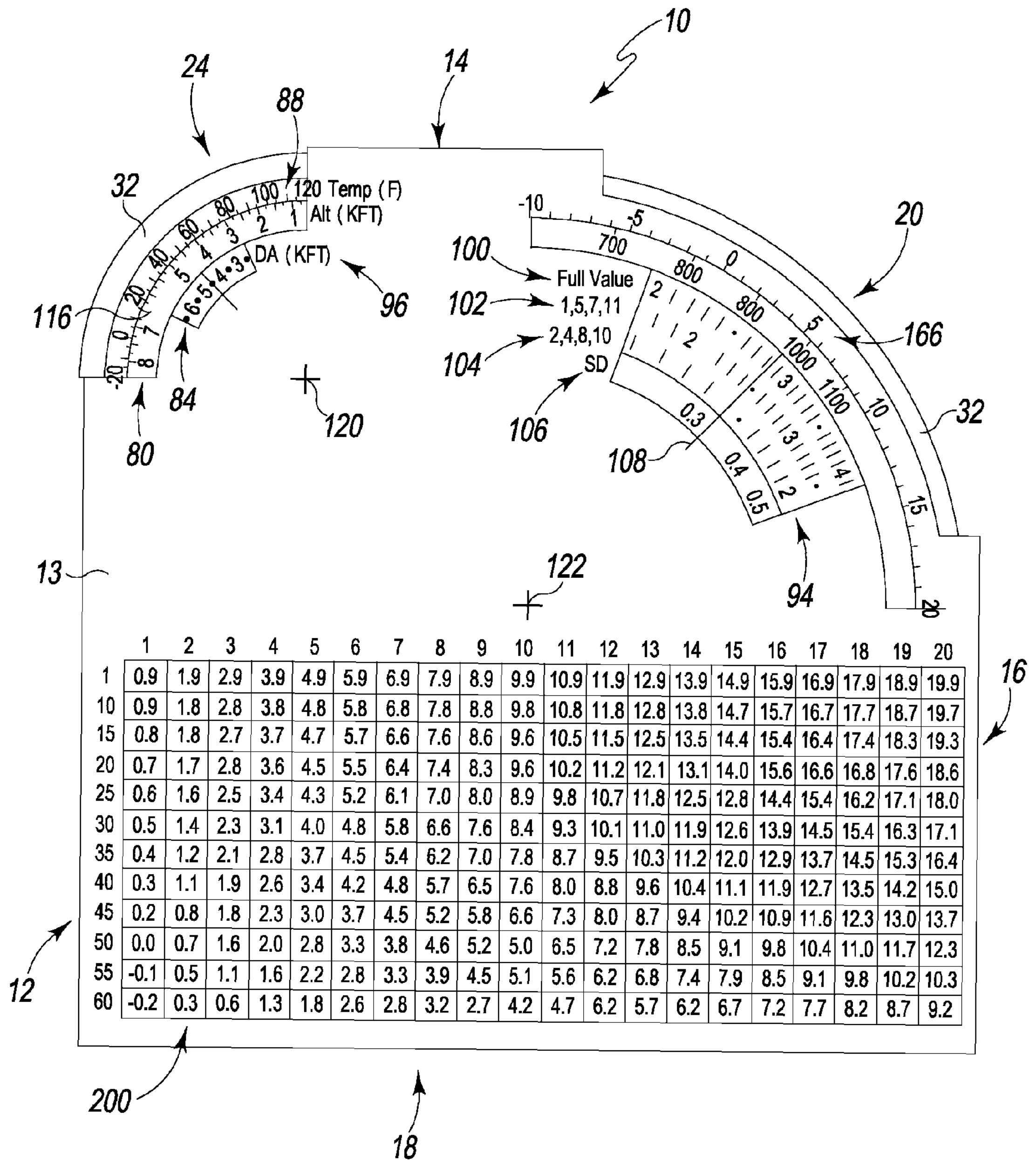
FIG. 2 is a rear view of the ballistic nomograph of FIG. 1.
Figure 7:
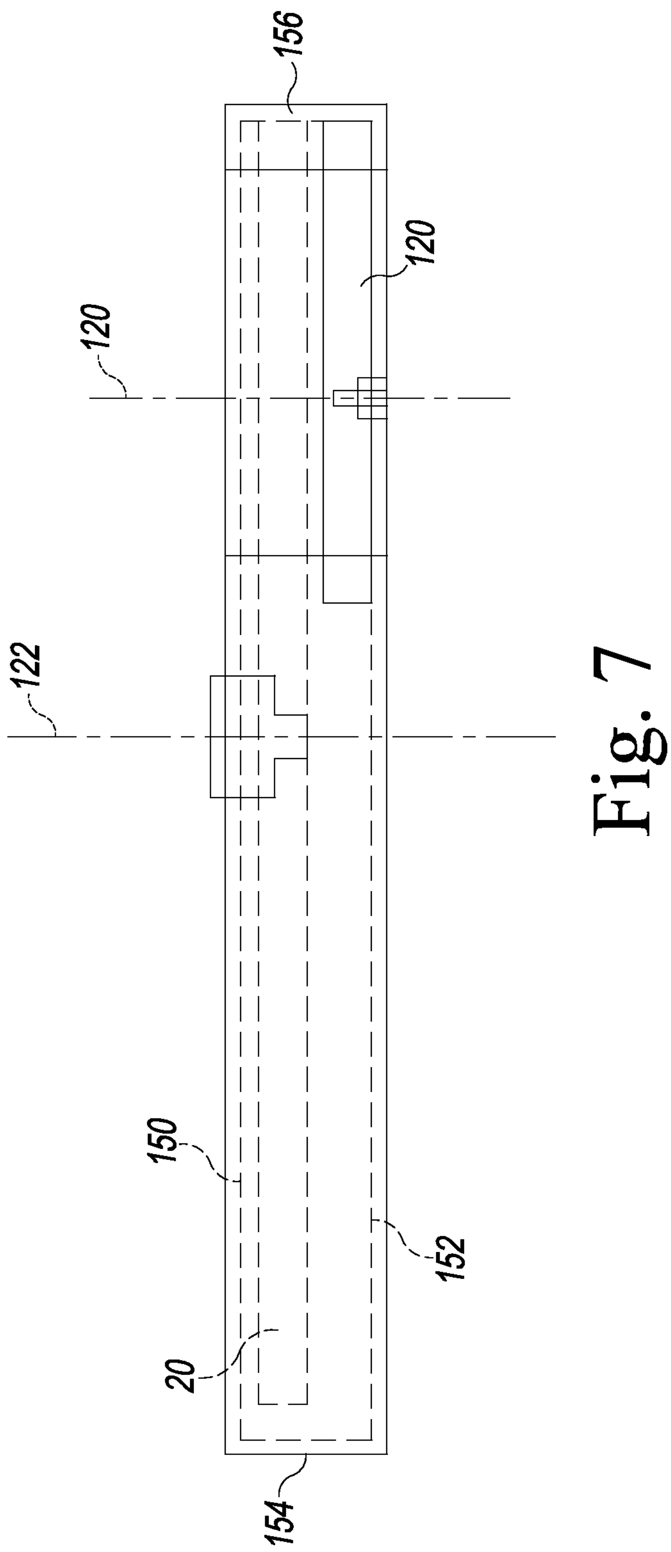
FIG. 7 is bottom view of the ballistic nomograph of FIG. 1.

The ballistic nomograph 10 has a front side 11 shown in FIG. 1 and a back side 13 shown in FIG. 2. Referring to FIG. 7, the ballistic nomograph 10 includes a front wall 150, a rear wall 152 and two side walls 154 and 156 respectively. The walls 150, 152, 154, and 156 enclose a wheel 24 rotatable about an axis 120 and a disk 20 rotatable about an axis 122. The wall 150, 152, 154, 156 as well as the wheel 24 and disk 20 each comprise a Lexan™ material having a thickness of approximately 0.020 inches. The Lexan™ material is thermally printed to provide indicia to the user. While the illustrative embodiment comprises Lexan™, it should be understood that any of a number of materials might be used. Lexan™ was chosen for the durability of the material in field conditions and the ability of the material to be thermally printed. As will be described in further detail below, a user rotates the wheel 24 and disk 20 such that particular indicia on the wheel 24 or disk 20 are aligned with indicia on the front side 11 or back side 13. The front side 11 and back side 13 include various indicators that appear adjacent to indicia on the wheel 24 or disk 20, to indicate the value of a variable to be used as a variable elsewhere on the ballistic nomograph 10 or as an output to the user.

Figure 3:
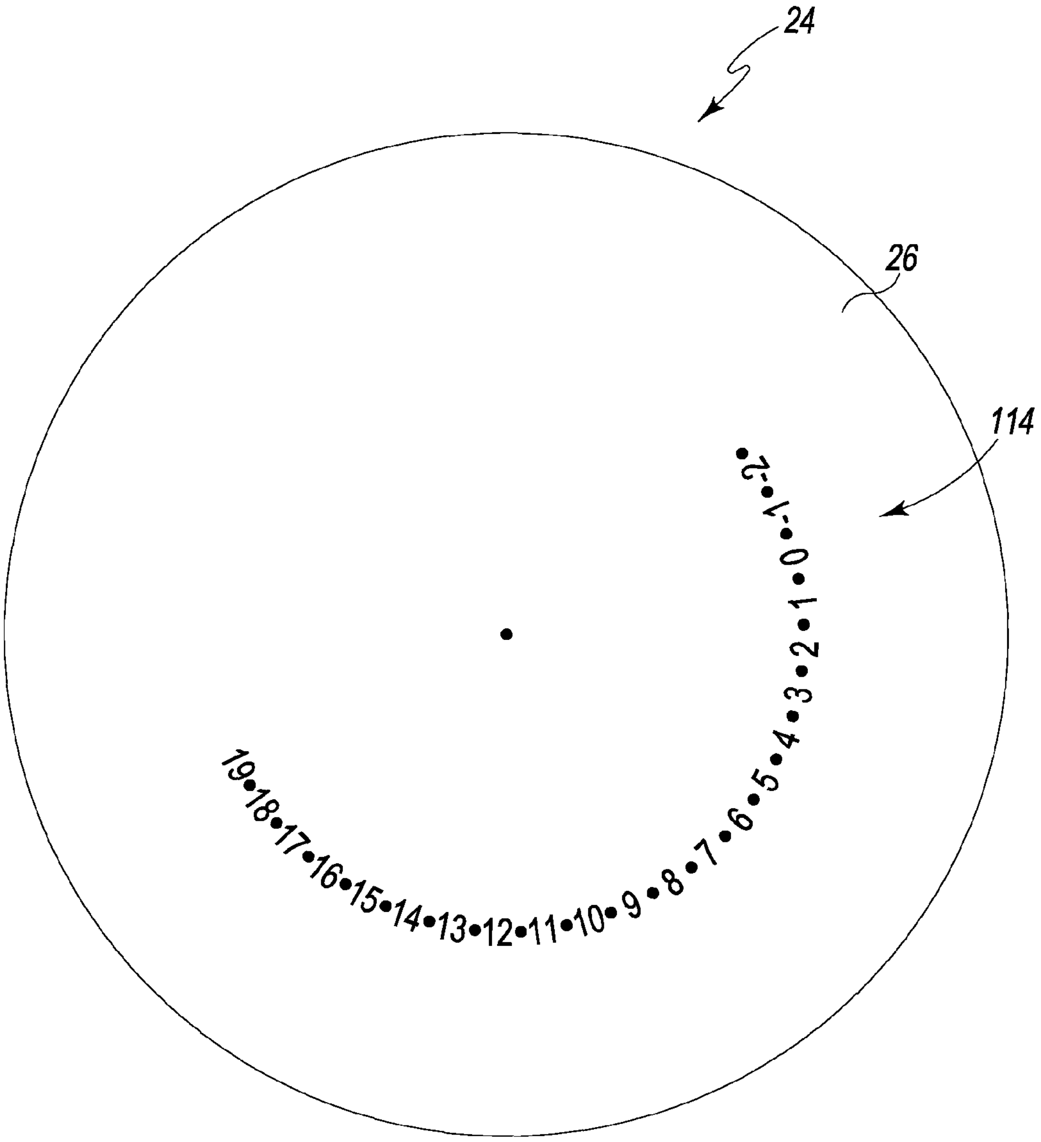
FIG. 3 is a front view of a movable wheel of the ballistic nomograph of FIG. 1.
Figure 4:
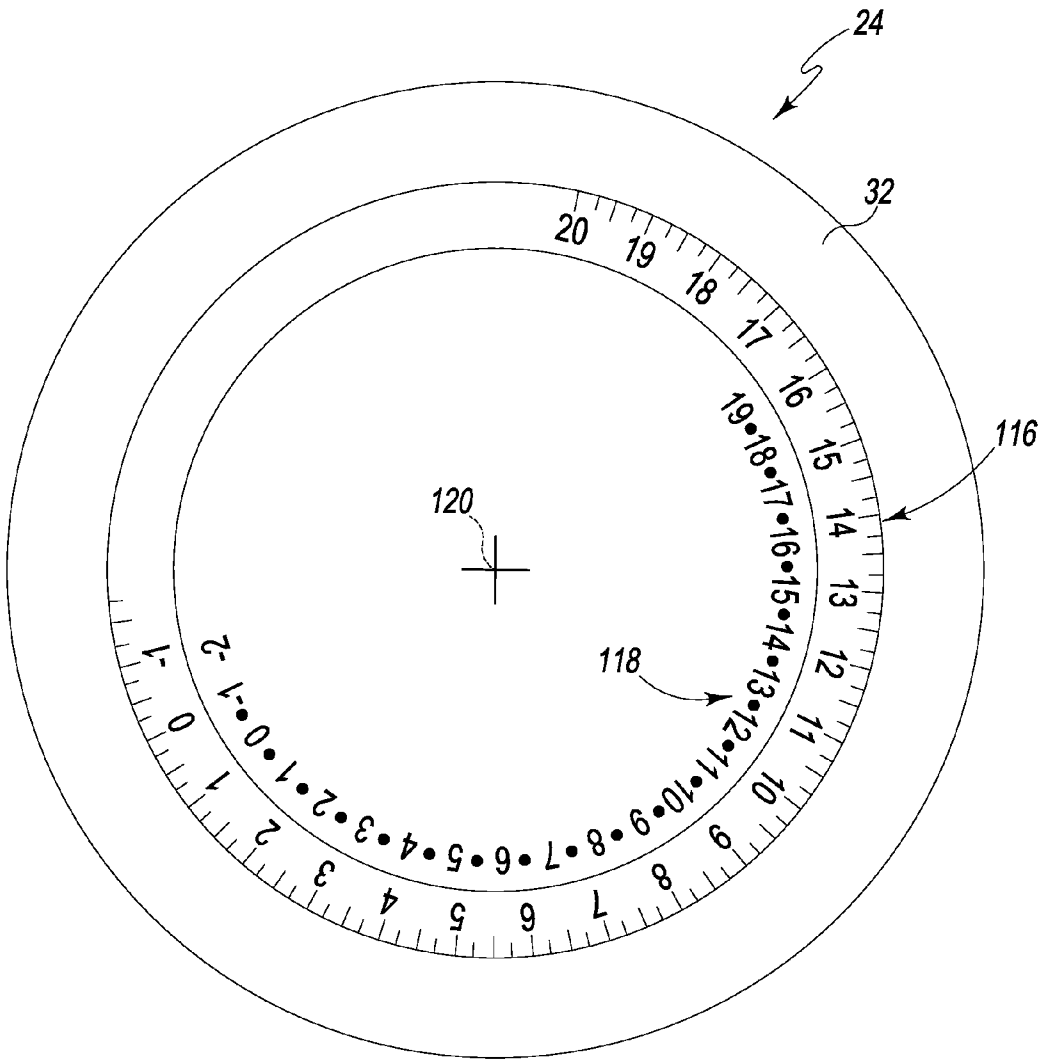
FIG. 4 is a rear view of the wheel of FIG. 3.

Referring again now to FIG. 1, the ballistic nomograph 10 has four edges: a top edge 12, a right edge 14, a bottom edge 16, and a left edge 18. The edges 12, 14, 16, 18 will be used to describe the orientation of the ballistic nomograph 10 when a user rotates the ballistic nomograph 10 from the front side 11 to the back side 13. The wheel 24 is positioned with a portion of a front side 26 of the wheel exposed at the corner where right edge 14 meets bottom edge 16. While most of the sides 11 and 13 are opaque, the ballistic nomograph 10 is formed with several transparent windows which allow a user to see indicia positioned on the wheel 24 or disk 20. For example, the front side 11 includes a window 110 which exposes a portion of the front side 26 of the wheel 24 as shown in FIG. 3, so that a user may view indicia 114 positioned on the wheel 24. The indicia 114 is indicative of a density altitude value (DA) which may be calculated by a user as will be described below. An indicator 112 overlies the indicia 114 to allow the user to discern the appropriate DA. While user may calculate the appropriate DA using the back side 13 of the ballistic nomograph 10, a user may also determine the DA from some other source.

As a general overview, having determined the appropriate DA, the user manipulates the disk 20 to align indicia corresponding to the distance from the firing point to the target with the appropriate DA to allow the user to determine the nominal vertical adjustment of the target point in milliradians (MILS). While milliradians are used in the illustrative embodiment, it should be understood that in some embodiments the ballistic nomograph 10 may be marked in minutes of angle (MOA) if the weapon being used has sighting that is organized in MOA.

Once the nominal vertical adjustment is determined, the user corrects for the look angle between the firing point and the target. The look angle is the value, in degrees, of the vertical difference between the firing point and the target. Upon determining the look angle from an external analysis, a user reviews the table 200 on side 13 of the ballistic nomograph 10. The user finds the nominal vertical adjustment value determined earlier on the top row of the table 200 and finds the look angle value in the left column of the table 200. Finding the intersection of the row having the correct look angle and the column having the correct nominal vertical adjustment, a user determines the corrected vertical adjustment. In some cases, interpolation of the corrected drop value is necessary and well within the skill of a user. The user then adjusts the aim point vertically based on the corrected drop value.

Once the corrected drop value has been determined and the appropriate adjustment made, the user then determines the horizontal adjustment by aligning the DA value with the range on the disk 20 on the side 13 of the ballistic nomograph 10 shown in FIG. 2. The wind correction is determined by comparing an indicator 108 with the appropriate wind direction by evaluating the magnitude of the wind and the direction. Indicia 98 adjacent a window 92 is corresponds to different values of DA. The range to the target appears in the window 92. The range value is aligned with the DA to establish a wind adjustment value. The value of the wind adjustment appears in a window 94 and is segmented into three values: full value, 87%, and 50%. The full value is used if the wind is moving perpendicular to the line of sight between (LOS) the firing point and the target. A value of 87% is used if the wind is moving at 30 degrees from full value. The value of 50% is used if the wind is moving at 60% from the full value or 30% from the LOS. The full value adjustment is shown in a window 94 along a full value line which corresponds to indicia 100. The 50% value is aligned in the window 94 with indicia 104. The 87% value is aligned in the window 94 with indicia 102. The user must make a determination of the aggregate wind speed and direction to determine the wind vector. The value that aligns with the indicator 108 is the adjustment for each 10 miles per hour of wind speed. The wind correction is expressed in tenths of MILS on the ballistic nomograph 10. The direction of the adjustment is determined by the user based on the direction of the wind vector. The aim point is adjusted into the wind to account for the effect of the wind.

Once the wind correction is determined, the user must also determine the lateral adjustment due to spin drift. This is done by viewing the spindrift associated with indicator 108. The spin drift is always in the direction of the rifling twist and is added to the wind adjustment. If the wind adjustment and the spin drift are in the same direction, then the two values are added. If the wind adjustment and spin drift are in opposite directions, the spin drift is subtracted from the wind adjustment.

Once a user has determined the corrections for the aiming point in both the vertical and horizontal direction, a user may true a particular weapon and ammunition combination. Truing allows a user to determine the trajectory adjustment that is unique to the particular weapon based on variations in the weapon and the ammunition. The truing value may then be used by user to correct the nominal values to determine a precise firing solution for a particular weapon. The action of truing corrects for the internal ballistics variations of the weapon as well as the ammunition aligning the ballistic curve with the ballistics drag function at the target point used to true the. Truing can be employed at specific and varying ranges to effectively alter the drag function to near perfectly provide a predictive fire solution for the weapon and ammunition combination at any range. The methodology of truing a weapon and ammunition combination provides an effective method of predicting near perfect fire solutions and should be employed to all weapons and ammunition variations.

Figure 5:
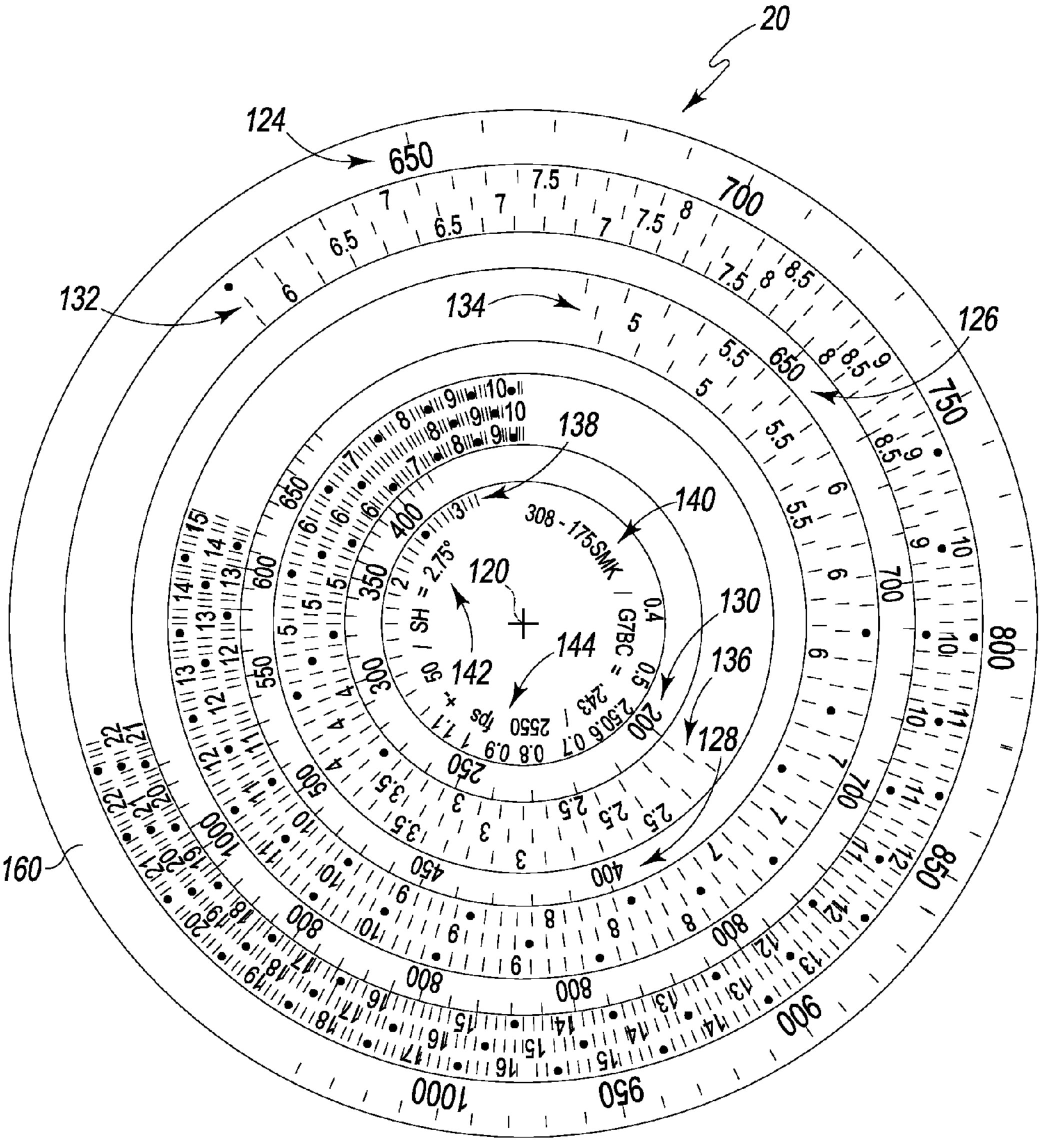
FIG. 5 is a front view of a disk of the ballistic nomograph of FIG. 1.
Figure 8:
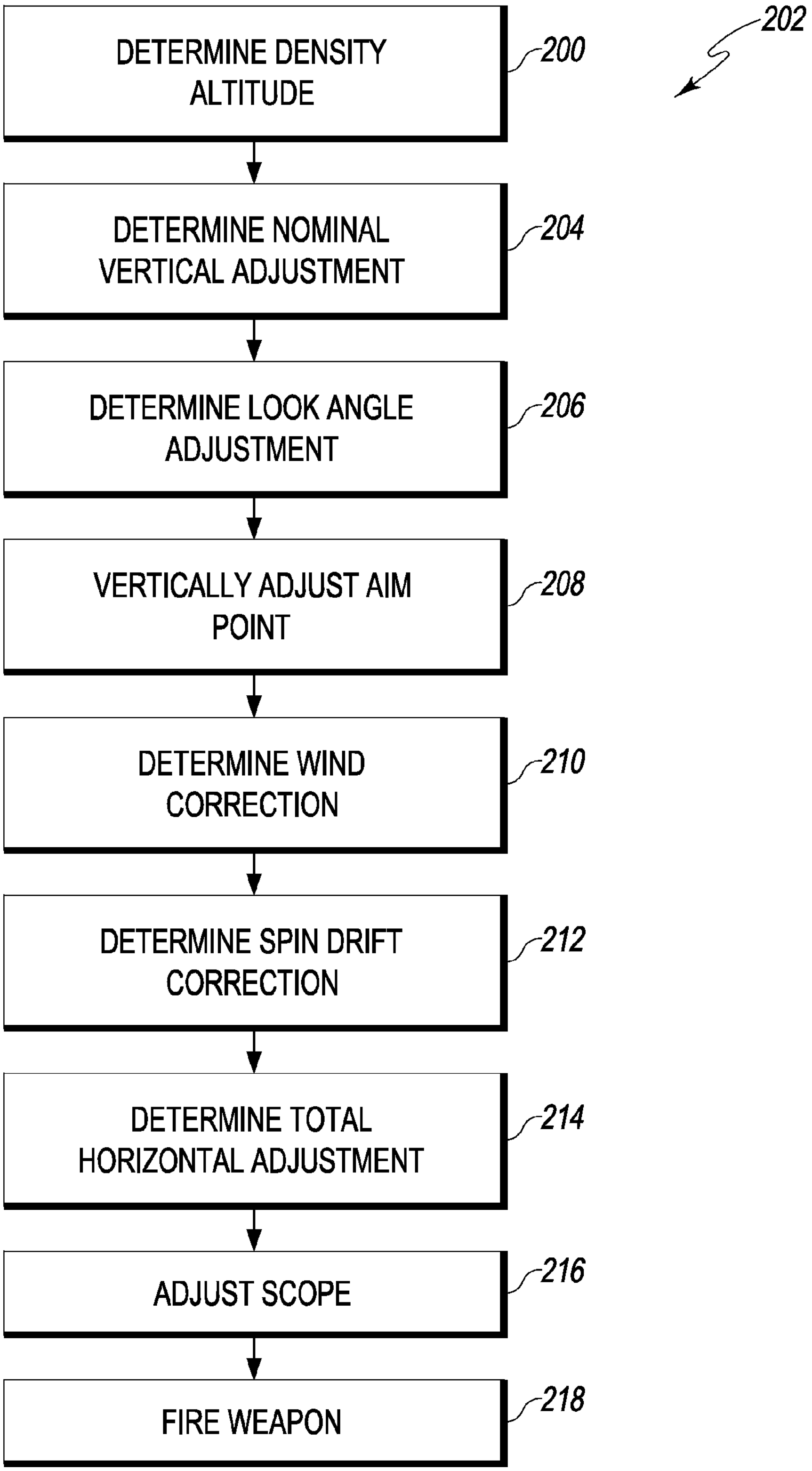
FIG. 8 is a flow chart showing the method of use of the ballistic nomograph of FIG. 1.

The method 202 for determining a firing solution, truing a firing solution, and implementing the trued firing solution is shown in FIG. 8 and described below. In the illustrative embodiment the disk 20 is adapted for the ballistics of a 308-175SMK/G7BC weapon/round combination as indicated by the reference indicator 140 in FIG. 5. The muzzle velocity 144 for this particular combination is nominally 2455 feet per second (fps) with a variation of +/−50 fps. The scope height 142 of 3.0 inches is the offset of the scope from the barrel of the weapon.

As an illustrative example of the process, it is assumed the weapon is to be fired at a range of 1000 yards at a 10 degree down look angle with at temperature of 45 degrees Fahrenheit and an altitude of 5000 feet above sea level. The wind is determined to be 15 miles an hour with a direction that is from 2 o'clock relative to the firing point. It should be understood that the firing solution determination and truing process can be performed with varied firing parameters and conditions and the following process is illustrative of only one specific set of conditions.

As shown in FIG. 8, at a first step 200 of a solution method 202, a user determines the density altitude by adjusting the wheel 24 on the back side 13 of the ballistic nomograph 10 to align the altitude of 5000 feet represented by indicia 116 on a back side 32 of the wheel 24. The indicia 116 appears in a window 80 of the ballistic nomograph 10 and is aligned with the corresponding temperature (45 degrees Fahrenheit) as indicated by indicia 88 shown on back side 13. An indicator 86 overlies the corresponding density altitude value shown in a window 84 as indicated by the indicia 96. The indicia 118 corresponding to various density altitude values is positioned on the back side 32 of wheel 24. The indicia 88, 116, and 118 are positioned so that the appropriate DA is aligned with indicator 86 when the temperature and altitude values are aligned. As shown in FIG. 2, the density altitude under the assumed conditions is approximately 5100 feet. In many instances, the user may have access to instrumentation to provide the altitude and or temperature. In some instances, the altitude and temperature may be estimated by the user.

Once the density altitude is determined at step 200, a user progresses to step 204 where the user turns the ballistic nomograph 10 to view the front side 11 and determine the nominal vertical adjustment. To make the determination of the nominal vertical adjustment, a user turns the disk 20 about the axis 122 to align the range to the target with the density altitude. Because of variations and range and density altitude combinations, four different outputs are available for the user. In a short range output 54, indicia 62 indicate variations of −10,000 feet to 20,000 feet in density altitude. Indicia 130 corresponding to target ranges 200-450 yards is positioned on a front side 160 of the disk 20 and appear in a window 56 on the front side 11 of the ballistic nomograph 10. Once the appropriate range in window 56 is aligned with the density altitude indicia 62 corresponding to the density altitude determined at step 200, the nominal vertical adjustment in MILS is aligned with an indicator 60 and appears in window 58. Indicia 138 corresponding to the range of values of nominal vertical adjustment for the short range output are positioned on the front side 160 of the disk 20.

In a medium range output 44, indicia 50 correspond to density altitude variations from −10,000 feet to 20,000 feet are positioned adjacent a window 46. The target ranges appearing in the window 46 vary from 400 yards to 750 yards and correspond to indicia 128 shown on the front side 160 of disk 20 in FIG. 5. The nominal vertical adjustment for this range appears in a window 48 as aligned with an indicator 52 and is aligned with indicia 148 adjacent the window 48. The indicia 136 corresponding to the vertical adjustment values for the medium range output 44 appear in three rows as will be discussed in further detail below.

The long range output is broken into two outputs with an output 34 having density altitude indicia 40 varying from −10,000 feet to 5000 feet. The target range indicia 126 appearing in a window 36 varies from 650 yards to 1050 yards is positioned on the front side 160 of the disk 20. Once the range and density altitude are aligned, indicia 134 corresponding to vertical adjustment values appears in a window 38 aligned with an indicator 42 and aligned with indicia 76. A second long range output 70 includes density altitude indicia 162 that varies from 5000 feet to 20,000 feet. Indicia 124 corresponding to target ranges that appear in a window 66 vary from 650 yards to 1050 yards. Indicia 132 corresponding vertical adjustment values appears in a window 68 aligned with an indicator 72 and indicia 168.

In the illustrative embodiment, the output 34 has the range of 1000 yards aligned with a density altitude of 5100 feet such that a nominal vertical adjustment value of 12.1 MILS is aligned with the indicator 42.

The user then determines the look angle correction at step 206 of method 202 by turning the ballistic nomograph 10 back over to view the table 200 on the back side 13. The look angle correction factor is found by finding the column corresponding to the nearest nominal adjustment in MILS which is column 12. Looking down the column 12 to find the row corresponding to the assumed look angle of 10 degrees, the user finds a corrected vertical adjustment value of 11.8 MILS. In the illustrative embodiment, a user may interpolate between column 12 and column 13 to approximate adjusted vertical adjustment to be 11.9 MILS. While the illustrative embodiment is graduated in full MILS, in other embodiments the look angle correction may provide additional data to reduce the need for interpolation. At step 208 of the method 202, the user then adjusts the scope of the weapon by a positive 12.2 MILS to account for the adjusted vertical adjustment value.

Figure 6:
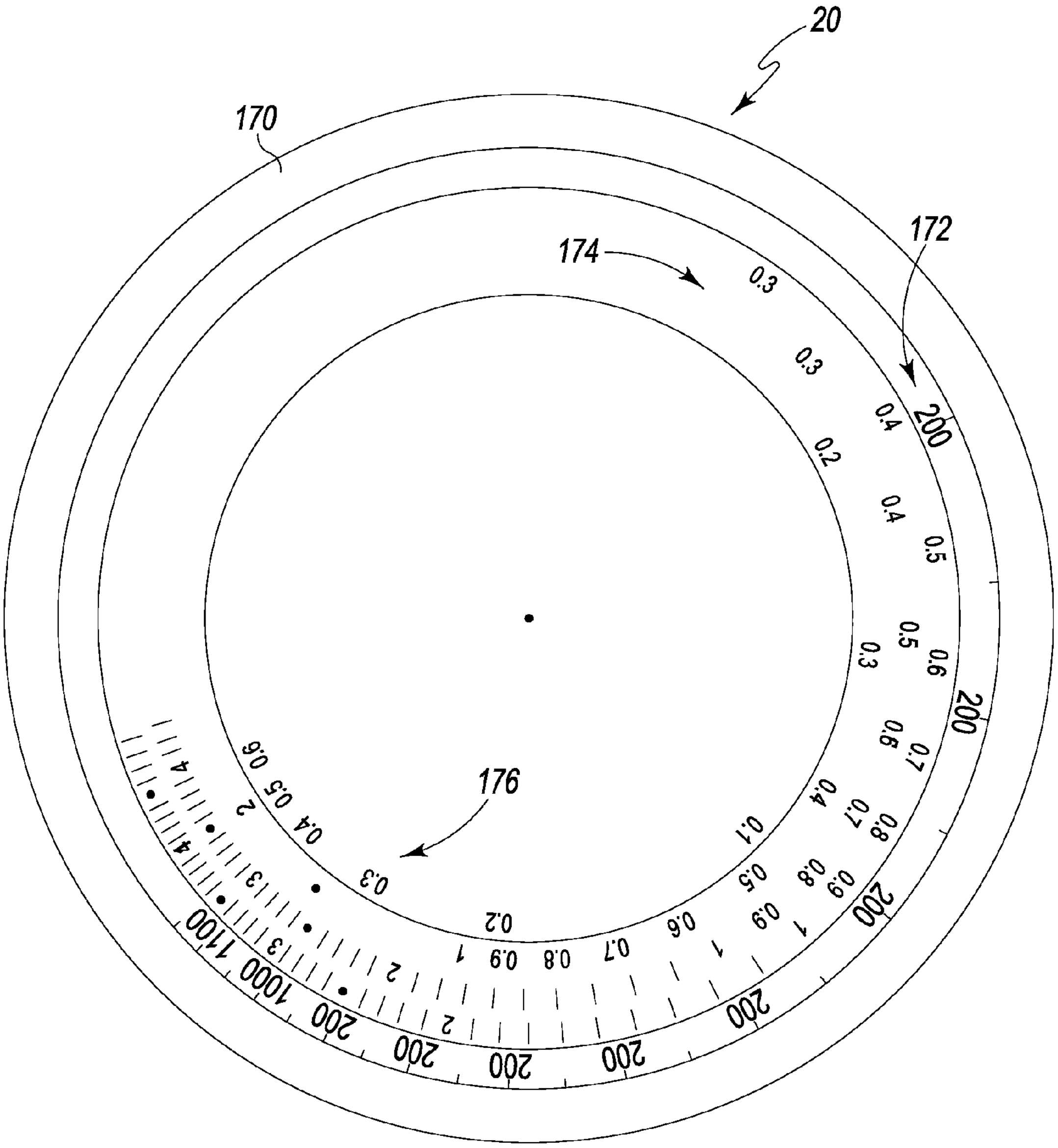
FIG. 6 is a rear view of the disk of FIG. 5.

Once the vertical adjustment to the weapon has been made, the user then proceeds to step 210 of the method to determine a horizontal adjustment value to be applied to the aim point by determining a wind correction and a spin drift correction. The user positions the disk 20 so that indicia 172 positioned on a back side 170 of disk 20 (seen in FIG. 6) corresponding to the target range value is aligned with the density altitude indicia 166 at the actual value of the density altitude in an output 90. Indicia 174 corresponding to wind correction values appears in window 94. With the wind coming from the right at two o'clock, the wind adjustment of 1.4 MILS is aligned with an indicator 108. This is the preliminary horizontal adjustment value.

The spin drift adjustment is determined at step 212 of method 202 by determining the spin drift value represented by indicia that is aligned with indicia 106 in window 94 which is illustratively 0.3 MILS. Indicia 174 indicative of the spin drift value is positioned on back side 170 of the disk 20. The spin drift value is directly related to the target range. In the illustrative embodiment, the rifle has a right hand twist, so the adjustment is to the left. At step 214, the wind adjustment and spin drift adjustment are combined to determine a total horizontal adjustment. In this case, the wind adjustment is 1.4 MILS to the right and the spin drift adjustment is 0.3 MILS to the left for a total adjustment of 1.1 MILS to the right. The user then adjusts the scope at step 216 of the method 202. The calculated firing solution is complete and the user fires the weapon at step 218.

Once the fire solution is complete, the user may true the weapon to account for variations from the theoretical firing solution determined with the ballistic nomograph 10. Truing may be necessary because of manufacturing variations in the weapon or ammunition. Truing may be made by considering variations in the muzzle velocity or ballistic coefficient of the weapon. In either case, the user determines the deviation of the actual firing solution from the theoretical firing solution to determine the firing error. This is done simply by firing the weapon with the theoretical solution applied and measuring the difference between the aim point and the point of impact of the round. This may be done with a single shot or a shot grouping. After determining the deviation of the actual impact from the target point, the user determines the vertical adjustment actually necessary eliminate the difference in the actual impact point. The user then reviews the appropriate output 34, 44, 54, or 70. Comparing the actual drop value to the nominal MV drop value, the user can determine what the muzzle velocity variation is in the weapon. This muzzle velocity correction may then be applied to future firing solutions. For example, a user may determine that a correction of −50 fps makes the firing solution true. In this case, the user will not use the nominal adjustment values at indicia 76, 148, or 168 in outputs 34, 40, or 70 respectively. Rather, the user will use the adjustment values that correspond to the −50 fps indicia: 74, 152, or 166 for each of the outputs 34, 40, or 70 respectively. The approach holds if the muzzle velocity must be corrected by +50 fps. The user will then use the adjustment values that correspond to the +50 fps indicia: 78, 154, or 170 for each of the outputs 34, 40, or 70 respectively. While the illustrative embodiment shows adjustments of +50 fps and −50 fps, it should be understood that any of a number of adjustment values may be shown on the ballistic nomograph 10, depending on the precision necessary for the particular weapon/ammunition combination.

As an alternative, the firing solution may be corrected by considering the variation to be based on the ballistic coefficient of the round. In this case, the user determines the deviation of the actual impact point(s) from the target point to determine the adjustment necessary to the drop solution. In this case, the user simply rotates the disk 20 until the actual drop observed appears as the nominal muzzle velocity. The user then determines the density altitude that aligns with the actual range of the shot. The difference between the density altitude observed during the truing process and the calculated density altitude is a density altitude correction that may be applied to future calculated density altitudes to get a corrected or trued density altitude. The correction is then applied to the density in future firing solutions to account for the variation of the weapon/ammunition variation from the theoretical firing solution.

Although the invention has been described with reference to the preferred embodiments, variations and modifications exist within the scope and spirit of the invention as described and defined in the following claims.

The invention claimed is:

1. A ballistic nomograph for determining a firing solution for small arms fire comprising a first member including first indicia corresponding to a plurality first environmental conditions and a first indicator positioned on the first member, and a second member movable relative to the first member, the second member including first indicia corresponding to a plurality of ranges to a target and second indicia corresponding to a plurality of first adjustment values corresponding to corrections to a nominal firing solution, wherein alignment of the first indicia of the first member with the first indicia of the second member such that alignment of the range to a target with a first environmental condition causes an first adjustment value to be aligned with the first indicator positioned on the first member so as to provide a firing solution adjustment to a user.

2. The ballistic nomograph of claim 1, wherein the first indicia on the first member includes a plurality of density altitude values.

3. The ballistic nomograph of claim 1, wherein the first adjustment value corresponds to an adjustment to the vertical setting of a rifle scope.

4. The ballistic nomograph of claim 1, wherein the second member is rotatably coupled to the first member such that the second member rotates about an axis.

5. The ballistic nomograph of claim 1, wherein the first member includes a plurality of windows and the first and second indicia of the second member are visible through the windows.

6. The ballistic nomograph of claim 1, wherein the second indicia on the second member includes a plurality of different adjustment values for each combination of range and environmental condition.

7. The ballistic nomograph of claim 6, wherein the plurality of different first adjustment values corresponds to variations in muzzle velocity.

8. The ballistic nomograph of claim 7, wherein the first adjustment values corresponding to variations in muzzle velocity comprises a range of continuous values.

9. The ballistic nomograph of claim 1, wherein the second member is marked with indicia that is unique to a particular combination of weapon and ammunition.

10. The ballistic nomograph of claim 1, wherein the nomograph comprises a kit having a plurality of second members and the second member is removable from the nomograph such that different second members may be used, with each second member marked with indicia that is unique to a particular weapon and ammunition and different from other second members.

11. The ballistic nomograph of claim 1, further comprising a third member movable relative to the first member, the third member marked with first indicia corresponding to a plurality of second environmental conditions, wherein the first member includes a second indicator and second indicia corresponding to a plurality of third environmental conditions.

12. The ballistic nomograph of claim 1, wherein alignment of the first indicia of the third member with second indicia of the first member causes a value of a first environmental condition to be positioned adjacent the second indicator of the first member.

13. The ballistic nomograph of claim 12, wherein the first environmental condition is density altitude, the second environmental condition is an altitude above sea level, and the third environmental condition an air temperature.

14. The ballistic nomograph of claim 13, wherein the density altitude, altitude above sea level, and air temperature each comprises a range of continuous values.

15. The ballistic nomograph of claim 1, wherein the first member includes a plurality of windows with each window corresponding to different ranges of first environmental conditions.

16. The ballistic nomograph of claim 1, wherein the first member includes indicia corresponding to a plurality of fourth environmental conditions and a third indicator.

17. The ballistic nomograph of claim 16, wherein the fourth environmental conditions includes wind vector values.

18. The ballistic nomograph of claim 17, wherein the second member includes indicia corresponding to a plurality of second adjustment values, wherein alignment of the first indicia of the first member with the first indicia of the second member such that alignment of the range to a target with a first environmental condition causes a second adjustment value to be aligned with the third indicator positioned on the first member and a fourth environmental condition on the second member so as to provide a firing solution adjustment to a user.

19. The ballistic nomograph of claim 1, wherein the first indicia corresponding to a plurality first environmental conditions comprises a range of continuous values of first environmental conditions.

20. The ballistic nomograph of claim 19, wherein the first indicia corresponding to a plurality of ranges to a target comprises a range of continuous values.

21. The ballistic nomograph of claim 20, wherein the second indicia corresponding to a plurality of first adjustment values corresponding to corrections to a nominal firing solution comprises a range of continuous values.

22. The ballistic nomograph of claim 1, wherein the first indicia corresponding to a plurality of ranges to a target comprises a range of continuous values.

23. The ballistic nomograph of claim 1, wherein the second indicia corresponding to a plurality of first adjustment values corresponding to corrections to a nominal firing solution comprises a range of continuous values.

* * * * *